United States Patent [19]

Nara et al.

[11] 4,278,740
[45] Jul. 14, 1981

[54] ALUMINUM-TIN BASE BEARING ALLOY AND COMPOSITE

[75] Inventors: Tamotsu Nara, Toyota; Soji Kamiya, Nishio, both of Japan

[73] Assignee: Taiho Kogyo Co., Ltd., Toyota, Japan

[21] Appl. No.: 47,336

[22] Filed: Jun. 11, 1979

[30] Foreign Application Priority Data

Jul. 11, 1978 [JP] Japan .................................. 53/84232
Jul. 11, 1978 [JP] Japan .................................. 53/84233

[51] Int. Cl.³ ............................................. B32B 15/04
[52] U.S. Cl. ....................................... 428/653; 75/138; 75/140; 75/147; 75/148
[58] Field of Search ................. 75/138, 148, 147, 140, 75/142; 428/653

[56] References Cited
U.S. PATENT DOCUMENTS 4,153,756  5/1979  Iwahana et al. ......................... 75/140

Primary Examiner—R. Dean
Attorney, Agent, or Firm—Blanchard, Flynn, Thiel, Boutell & Tanis

[57] ABSTRACT

An aluminum-tin (Al-Sn) base bearing alloy and a bearing material which is made by applying the Al-Sn base bearing alloy to a backing steel sheet by pressure welding. The Al-Sn base bearing alloy of the invention is characterized in that the coarsening of tin particles and the lowering of the hardness under high temperature conditions are quite small so that the wear resistance as well as the fatigue strength of the alloy are quite excellent. The Al-Sn base bearing alloy comprises 3.5-35 wt.% of Sn; 0.1-1.0 wt.% of Cr; 1-10 wt.% in total of one or more members selected from the group of specified additives consisting of Si, Cr, Mn, Sb, Ti, Zr, Ni and Fe; and the remainder of aluminum. The Al-Sn base bearing alloy of the invention can further contain 3 wt.% or less in total of Cu and/or Mg and 9 wt.% or less in total of one or more members of Pb, Bi and In, thereby improving the bearing characteristics. The wear resistance of this bearing alloy can be expected even when the shaft to be supported is hard and the shaft surface is coarse. Accordingly, a marked effect can be obtained when the bearing alloy is used for the bearing devices of internal combustion engines in which spheroidal (nodular) graphite cast iron is generally used for crank shafts.

20 Claims, 13 Drawing Figures

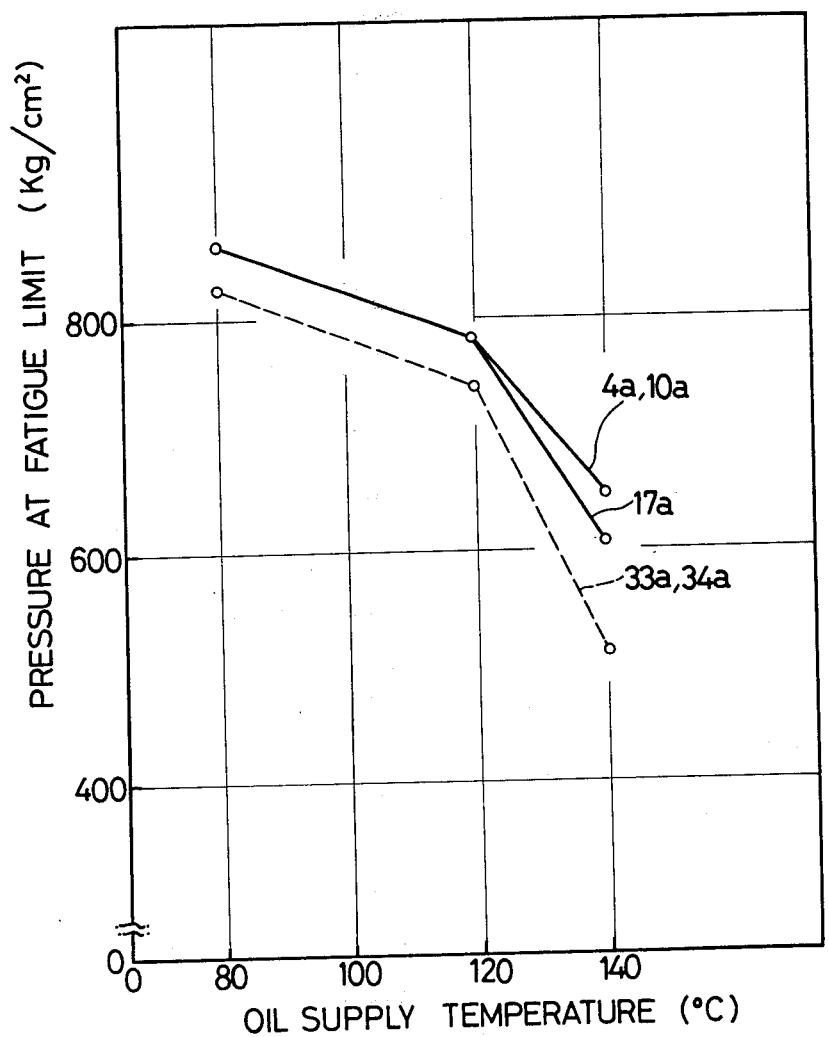

F I G. 5A
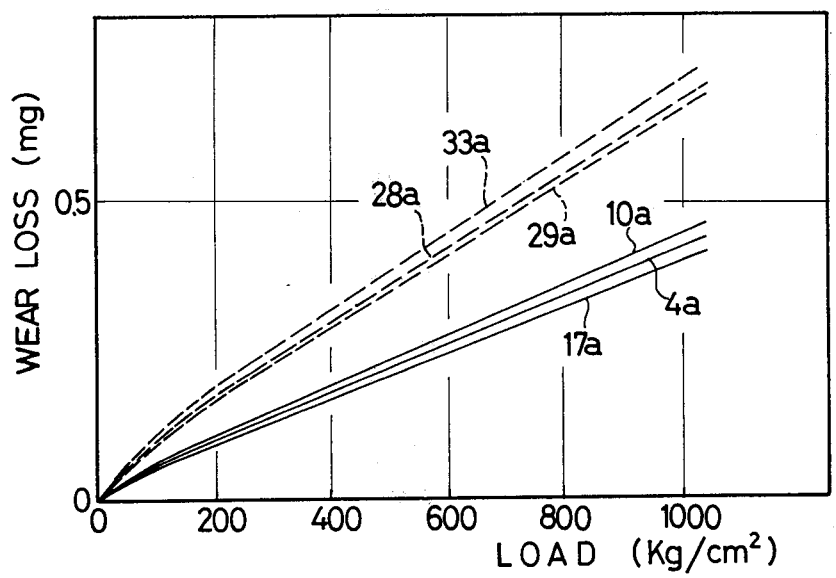
F I G. 6A
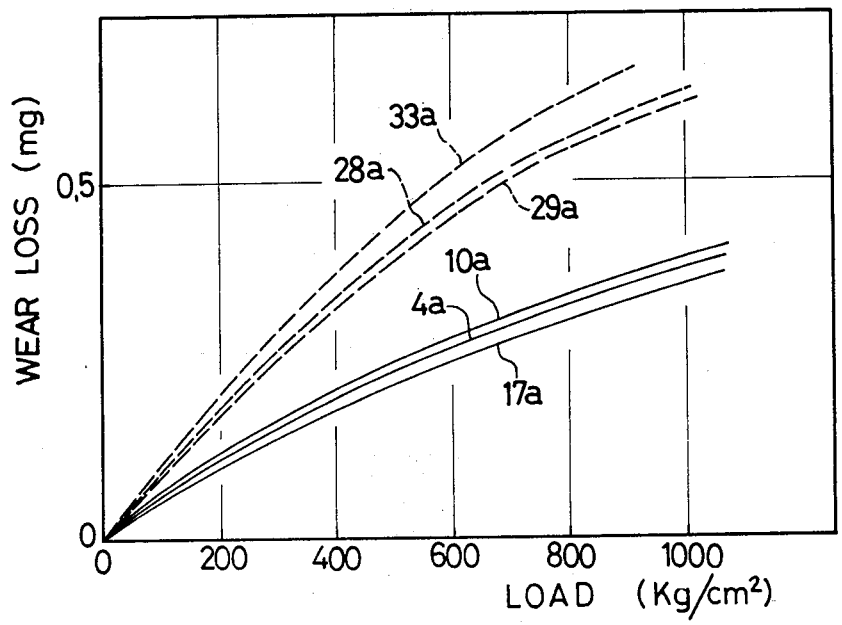

F I G. 7A
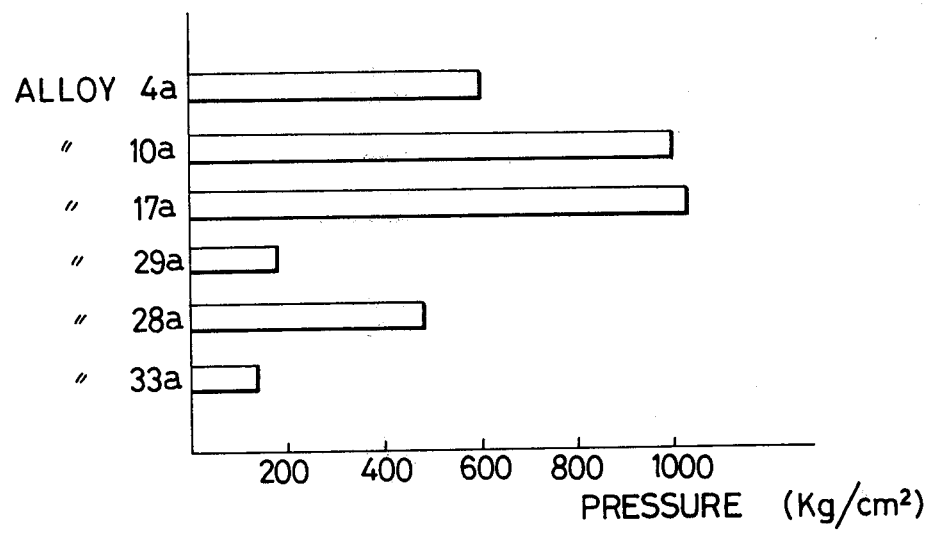
F I G. 7B
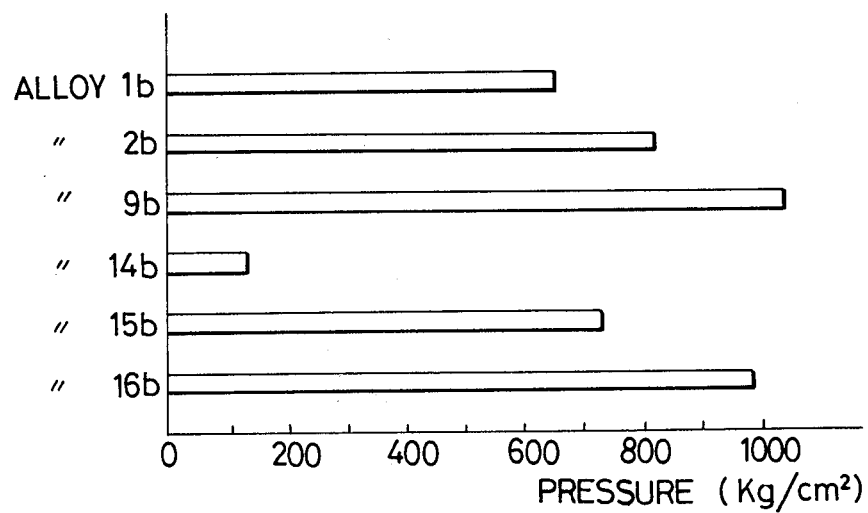

ALUMINUM-TIN BASE BEARING ALLOY AND COMPOSITE

BACKGROUND OF THE INVENTION (1) Field of the Invention

The present invention relates to an aluminum-tin (Al-Sn) base bearing alloy which is prepared by adding tin to an aluminum matrix and to a bearing material which is made by applying the Al-Sn base bearing alloy to a backing steel by pressure welding. More particularly, the Al-Sn base bearing alloy of the invention is characterized in that the bearing alloy is improved in several properties thereof by adding various kinds of additive elements. That is, the fatigue strength is much improved by reducing the lowering of the hardness at high temperatures and, especially, by avoiding the coarsening of tin particles. Furthermore, the wear resistance of the bearing alloy is also raised in order to improve the durability relative to the shaft to be supported which has a hard and coarse surface. Accordingly, in the case that the bearing alloy of the present invention is used for the bearing devices around the crank shafts of internal combustion engines which require severe conditions, remarkable advantages can be expected.

(2) Description of the Prior Art

In recent years, the automobile internal combustion engines are required to be made compact and to have high power. Further, as the countermeasure to the regulation of exhaust gas, they must be provided with blow-by-gas recirculation devices or the like. Therefore, the use conditions for the bearing materials in the internal combustion engines have become severe at high loads and high temperatures. Under such severe conditions, the conventional barrier materials are liable to cause fatigue failure and abnormal wearing which cause several troubles.

In connection with the shafts to be brought into engagement with the bearing materials, there is a tendency to use, in place of the hitherto produced forged shafts less expensive shafts made of spheroidal graphite cast iron or other coarse material in order to reduce the production costs. Therefore, improvements in the wear resistance, seizure resistance and fatigue resistance at high temperatures are required.

Exemplified as the Al-Sn base alloy used for making the bearings of internal combustion engines in the prior art are: Al (remainder)-Sn (3.5-4.5)-Si (3.5-4.5)-Cu (0.7-1.3); Al (remainder)-Sn (4-8)-Si (1-2)-Cu (0.1-2)-Ni (0.1-1); Al (remainder)-Sn (3-40)-Pb (0.1-5)-Cu (0.2-2)-Sb (0.1-3)-Si (0.2-3)- Ti (0.01-1); Al (remainder)-Sn (15-30)-Cu (0.5-2); and Al (remainder)-Sn (1-23)-Pb (1.5-9)-Cu (0.3-3)-Si (1-8), in which the values in parentheses denote the percentages by weight of the component materials.

When these conventional alloys are used for the bearings of automobile internal combustion engines under severe conditions as described above, fatigue failure is sometimes caused to occur in a short time if the engines are continuously operated under heavy loads. This is considered to be due to the fact that the temperature of the lubricant oil in an internal combustion engine becomes very high during the continuous full-load running thereof, for example, the temperature of the lubricant oil in an oil pan reaches 130° C.-150° C., so that the temperature of the sliding surfaces of bearings also becomes very high. As the result, since the eutectic point of such alloy is about 225° C. or so, the hardness of the alloy rapidly becomes low under the high temperature conditions, which causes fusion and migration of the Sn component and the fatigue strength is resultantly lowered. The inventors of the present invention have prepared an alloy, the hardness of which is not lowered at high temperatures and the Sn component of the alloy is hardly altered. The alloy was worked into the shapes of bearings for internal combustion engines and they were subjected to fatigue tests under dynamic loads at high oil temperatures. As a result, the improvement in fatigue strength was recognized, which substantiated the above-mentioned consideration.

Further, in addition to the lowering of the fatigue strength due to the loss of hardness at high temperatures as mentioned above, the coarsening of tin particles in the texture of conventional Al-Sn alloy also causes lowering of the fatigue strength. That is, the aluminum bearing material is generally formed by applying Al-Sn alloy to a backing steel through pressure welding, in which an annealing step is required after the pressure welding in order to improve the adhesive strength between both metals. The annealing is generally done at a temperature below the point at which an Al-Fe intermetallic compound deposits and the higher the treating temperature is and the longer the treating time is, the larger the adhesion strength becomes. As a matter of fact, when the conventional Al-Sn alloy is placed in a high temperature condition during annealing, the coarsening of aluminum grain boundaries and tin particles is disadvantageously caused to occur in the alloy texture. That is, when the conventional aluminum bearing alloy is subjected to annealing in order to improve the adhesive strength to the backing steel, the coarsening of tin particles is brought about, which results in the lowering of the fatigue strength of the Al-Sn alloy at high temperatures.

Further, these conventional Al-Sn bearing alloys are not good enough in wear resistance. Especially, when shafts having hard and coarse surfaces such as those made of spherical graphite cast iron are brought into engagement with the bearing alloys, the wear resistance is greatly lowered and fatigue failures are liable to occur, which has been a serious problem in the prior art.

BRIEF SUMMARY OF THE INVENTION

Accordingly, in order to eliminate the above-described disadvantages in the conventional Al-Sn base bearing alloy, the primary object of the present invention is to provide an Al-Sn base bearing alloy which exhibits a small lowering of hardness at high temperatures, and as a result, has a high fatigue strength.

Another object of the present invention is to provide an improved Al-Sn base bearing alloy in which the coarsening of tin particles is not caused to occur during the annealing step or during the use under high temperature conditions, which results in a high fatigue strength.

A further object of the present invention is to provide an Al-Sn base bearing alloy having a high wear resistance, especially a bearing alloy exhibiting a high wear resistance to shafts which are made of hard and coarse materials such as spheroidal graphite cast iron that is used for making the crank shafts of internal combustion engines.

Still a further object of the present invention is to provide a bearing material which is made by applying the above bearing alloy to the surface of a backing steel sheet and bearing devices for internal combustion engines which are made of the above bearing material.

According to the present invention, the Al-Sn base bearing alloy basically comprises 3.5-35 wt.% of Sn; 0.1-1.0 wt.% of Cr; 1-10 wt.% in total of one or more members selected from the group of specified additives consisting of Si, Cr, Mn, Sb, Ti, Zr, Ni and Fe; and the remainder of aluminum. In order to improve the bearing characteristics, the Al-Sn base bearing alloy of the invention can further contain 3 wt.% of less in total of Cu and/or Mg, and/or 9 wt.% or less in total of one or more members of Pb, Bi and In. In connection with the above additives, the addition of 0.1-1.0 wt.% of Cr is effective especially in the prevention of the lowering of the hardness at high temperatures, and also in the prevention of the coarsening of Sn particles. Further, it is considered that the specified additive group exhibits a notable effect in improving the wear resistance. Furthermore, it should be noted that Cr is included in the specified additive group.

BRIEF DESCRIPTION OF THE DRAWINGS

The objects, features and advantages of the present invention will be more clearly understood from the following detailed description, examples and accompanying drawings, in which:

FIGS. 2A and 2B are also graphs showing the changes in fatigue limits with the changes of oil temperatures in connection with the Al-Sn base bearing alloys of the present invention and prior art alloys;

FIGS. 5A and 5B are graphs showing the changes in wear losses of alloys with the increases of loads applied to steel shafts which are in contact with the alloys;

FIGS. 6A and 6B are graphs showing the changes in wear losses of alloys with the increase of loads applied to the shafts made of spheroidal graphite cast iron which are in contact with the alloys;

FIGS. 7A and 7B are graphs showing the seizing surface pressures of alloys which are in contact with the shafts made of nodular graphite cast iron.

DETAILED DESCRIPTION OF THE INVENTION

Figure 1A:
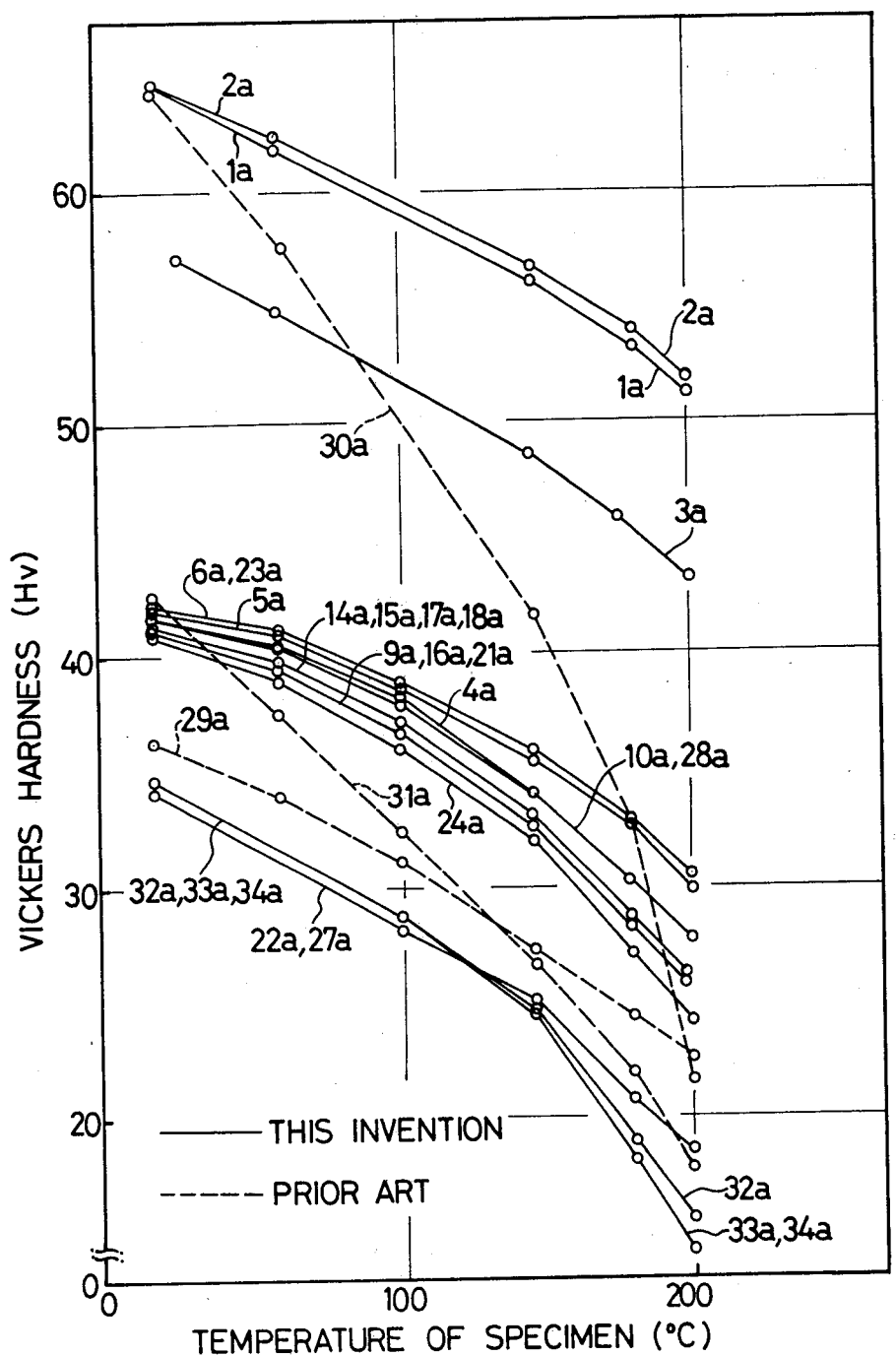
FIGS. 1A and 1B are graphs showing the changes in hardness with the changes of temperatures in connection with the Al-Sn base bearing alloys of the present invention and prior art bearing alloys of the same type.

The Al-Sn base bearing alloy of the present invention is prepared by adding the above-mentioned Sn, Cr, and one or more members of the foregoing specified additive group to the matrix of aluminum.

Though the tin is added for the main purpose of lubrication, the reason why the content of tin is restricted to the range of 3.5 to 35 wt.%, preferably 10 to 30 wt.% depends upon the fact that the addition of tin in an amount of more than 35 wt.% improves the conformability and low friction property. However, it reduces the hardness of the bearing alloy. When the quantity of tin is less than 3.5 wt.%, on the contrary, the bearing alloy becomes too hard and is insufficient in view of the conformability or the like. According to the prior art, the upper limit of the amount of tin has been regarded as being about 15% to the Al-Sn alloy so as to separately disperse tin particles, because it has been considered that, when more than 15% of tin is contained, the tin particles in the aluminum matrix cannot exist in a separated state but rather they exist in a continuous state and the hardness under high temperature conditions becomes low. In the present invention, however, the addition of tin up to 35 wt.% has been made possible without any practical disadvantage, by the effect of the addition of the other elements. The addition quantity of tin in the range of 3.5 to 35 wt.% can be determined properly in compliance with expected uses. Generally speaking, the addition quantity of tin is made small when a bearing receives a large load, while for light duty purpose, much tin can be added to the bearing alloy. In another viewpoint, when there is fear of seizure, the addition quantity of tin may be increased, while if there is no fear of seizure, the quantity of tin may be reduced. However, in recent cases, a temperature of bearing often becomes high due to the high temperature oil and this causes the deformation of the bearing which is followed by the occurrence of seizure and fatigue. Therefore, the addition quantity of tin may be determined from the view point to reduce the deformation at high temperatures.

The addition of chromium (Cr) is effective in that the hardness of the alloy is raised to prevent the alloy from softening at high temperatures and thus the coarsening of tin particles is not caused to occur even in annealing. In the first place, the effects to raise the hardness and to avoid the softening of alloy at high temperatures will be described. When the quantity of chromium is less than 0.1 wt.%, the improvement in high temperature hardness cannot be expected. If the addition quantity of chromium exceeds 1.0 wt.%, the Al-Cr inter-metallic compound cannot be dispersed finely and evenly as described later on, therefore, the effect of the addition becomes low. Accordingly, the addition quantity of chromium is limited in the range of 0.1 to 1.0 wt.%, preferably 0.1 to 0.7 wt.%. More particularly in connection with the improvement in the high temperature hardness, the chromium forms a solid solution in aluminum which raises the recrystallization temperature of aluminum and, in addition, the solid solution itself improves the hardness of the aluminum matrix. At the same time, the hardness of the alloy containing chromium becomes higher even when it is subjected to rolling several times which is contrasted to casting. With the rise of the recrystallizing temperature of aluminum, the bearings of engines that are exposed to high temperatures can maintain their mechanical properties. Especially, the lowering of hardness at high temperatures can be reduced and the softening of bearings in a high temperature range can well be avoided, thereby improving the durability of bearings. Further, the Al-Cr inter-metallic compound that is deposited over the limit of solid solution, has a Vickers hardness of more than about 370 so that the dispersion of such the compound aids the bearing alloy in maintaining the hardness at high temperature. Therefore, the dispersion of such the inter-metallic compound in a proper quantity gives a good effect. The preferable range of quantity of chromium is, as described above, 1.0 wt.% or less, and if the quantity of chromium is within such the range, fine and uniform deposition of the inter-metallic compound is formed and it increases the hardness of the bearing alloy.

The effect of the addition of chromium to avoid the coarsening of tin particles will be described in the following. The coarsening of tin particles is a phenomenon owing to the migration of aluminum grain boundaries and tin particles in a high temperature condition of the Al-Sn alloy. Since the chromium is precipitated as the above-mentioned Al-Cr inter-metallic compound which is finely dispersed in the aluminum alloy matrix, this inter-metallic compound inhibits directly the migration of aluminum grain boundaries and, at the same time, it obstructs the growth of aluminum crystal grains. Therefore, the migration of tin particles is also hindered and, as the result, the coarsening of tin particles can be avoided. This is related to the fact that the finely divided tin particles are retained as they stand during the repeat of rolling and annealing, and the above-described various effects can be obtained. Such phenomenon can be observed when the quantity of tin is small, however, the effect becomes larger when the quantity of tin is relatively large (more than about 10 wt.%). Especially, in the case that the quantity of tin exceeds about 15 wt.% in which the tin particles exist in a continued state, the effect of the addition becomes notable. Further, even when the quantity of tin is less than 10 wt.%, the effect of addition of chromium is, of course, expected sufficiently according to use conditions and utilities of the alloy.

Furthermore, the liquidation of tin particles having a low melting point of about 232° C. can be prevented effectively under high temperature conditions because the tin particles are well maintained in a finely divided state in the aluminum matrix. From this viewpoint, the effect of the prevention of lowering in hardness will be understood.

In the above passage, the effect for preventing the coarsening of tin particles in the annealing step is described. This effect can also be expected in the working condition of the bearing material in which the temperature is equal to the annealing condition. Accordingly, the fatigue strength in practical uses can also be improved with the inhibition of softening.

In order to improve mainly the wear resistance, it is effective to add one or more members of the group of the specified additives such as silicon (Si), chromium (Cr), manganese (Mn), antimony (Sb), titanium (Ti), zirconium (Zr), nickel (Ni) and iron (Fe). The addition quantity of each of these elements is within the range of a trace to 10 wt.%, while the total quantity of these elements is not more than 10 wt.%, and preferably in the range of 1 to 6 wt.%, which quantity may be determined in accordance with the purpose of use. The reason for the above restriction is as follows. The precipitated substances (or crystallized substances, the same shall apply hereinafter) of these elements are dispersed in the aluminum matrix, therefore, the wear resistance can be improved. If the addition quantity of the specified additive is less than 1 wt.%, the effect of addition cannot be exhibited. On the contrary, if the addition quantity is more than 10 wt.%, the precipitated substance becomes too much, so that the adaptability to rolling becomes worse and the repeating of rolling and annealing becomes difficult. Further, the formation of the fine particles of tin is inhibited. In order to eliminate these undesirable effects completely, the preferable upper limit is made 6 wt% or so. By the way, chromium is included in the above specified additives. Therefore, when the chromium is selected from the group of the specified additives, the total quantity of the chromium of 0.1 to 1.0 wt.% that is described in the foregoing passage and the chromium as the specified additive, is in the range of 1 to 10 wt.%.

The forms of precipitation of these specified additives are the precipitated substance of each added element, those of inter-metallic compounds between the added elements, those of inter-metallic compounds of aluminum and added elements, and those of inter-metallic compounds of aluminum and the inter-metallic compound of added elements. The wear resistance can be improved by the precipitated substances in any forms of the above.

The Vickers hardnesses of these precipitated substances reach several hundreds, so that the precipitated substances are very hard and the wearing of bearings caused by the friction with shafts can be reduced notably by the precipitated substances. Accordingly, a quite good result can be obtained when a proper quantity of the precipitated substance exists in the aluminum matrix. The range of the proper quantity is 1 to 10 wt.% as described above, and if the quantity of the precipitated substance is in this range, the precipitated substance can be dispersed uniformly and the wear resistance can effectively be improved without causing any ill effects such as the lowering of conformability.

The effect to improve the wear resistance is remarkable when the bearing supports a shaft having a hard and coarse surface. The performance of a bearing generally depends upon the hardness and coarseness of the material to be supported to a great extent. For example, when the conventional Al-Sn base bearing material is used for supporting a shaft made of spheroidal graphite cast iron, the properties of the bearing such as antiseizing property, and wear resistance are markedly lowered. Since the shafts made of spheroidal graphite cast iron can be produced at low cost, such shafts have been widely employed recently in place of steel shafts. In the iron matrix of the shaft, soft graphite particles are scattered. Therefore, when the shaft surface is scraped, blade-like grinding burrs are formed around the particles of graphite. When the shaft having such grinding burrs is slid relative to the bearing under a heavy load in which the coarsenesses of the shaft and the bearing and the thickness of the oil film between them are equal to each other, the bearing surface which is softer than shaft is ground. If such the condition is continued, the surface of the bearing becomes coarse and the clearance between the bearing and the shaft becomes large, which causes breakage of the film or the lack of an oil film. As a result, the direct contact between the shaft and the bearing (the metal-to-metal contact) is caused to occur, which results in the occurrence of seizure of both the parts.

While, in the alloy according to the present invention, the precipitated substance which is formed in the aluminum matrix by the addition of one or more members of the above specified additives, is harder than the above-mentioned grinding burrs of the shaft of spheroidal graphite cast iron. Therefore, the precipitated substance removes the above-mentioned grinding burrs from the surface of the shaft and, in addition, the metal transfer and adhesion of the precipitated substance is hard to occur. Therefore, the course of wearing of the bearing surface can be suppressed within a relatively short time to cause the formation of a stable oil film. As a result, in relation to the shaft made of the spheroidal graphite cast iron, the wear resistance and the antiseizing property of the bearing can be improved.

By the way, among the group of specified additives, silicon is most preferably used because the silicon itself is hard, the inter-metallic compounds between the silicon and other elements are also hard, and the Al-Sn alloy containing silicon is excellent in casting property. In view of the above properties, the group of chromium, manganese and antimony are of next to the silicon. The rank of the above chromium, manganese and antimony is followed by titanium, zirconium and nickel because the latter elements are somewhat inferor in the casting property. The element iron can be used if the anticorrosiveness is not a problem.

In addition to the above-described compositions of the present invention, the bearing alloy can further contain more than zero to 3 wt.% of copper (Cu) and/or magnesium (Mg). The copper and/or magnesium are added in view of the fact that they reduce the lowering of the hardness at high temperatures. The preferable range of the addition of them is 0.1 to 2.0 wt.%. When the addition quantity of them is less than 0.1 wt.%, the rise of hardness cannot be expected so much, while if the addition quantity is more than 3.0 wt.%, the alloy becomes too hard to reduce the rolling property and the anticorrosiveness is lowered. Further, with regard to the magnesium, the addition of more than 3 wt.% increases the hardness, however, the rise in hardness during the roll working becomes too large, therefore, satisfactory rolling cannot be performed and it becomes difficult to obtain a quite fine tin texture. Furthermore, the magnesium existing as a solid solution in the aluminum matrix is liable to deposit during the annealing. Therefore, the reinforcing of the aluminum matrix by the solid solution cannot be expected owing to the deposition of the excess magnesium. Therefore, the preferable ratio of addition is not more than 2.0 wt.%. Further, the effect of the addition of copper and/or magnesium is exhibited when the chromium is added simultaneously, and the effect to raise the hardness at high temperatures cannot be expected when only the copper and/or magnesium are added. In other words, if copper and/or magnesium are added to the aluminum matrix, the hardness in the rolling is much raised, which is remarkable as compared with the case in which other elements are added to the aluminum matrix. It is to be noted, however, that the aluminum matrix containing the copper and/or magnesium is easily softened at about 200° C. Therefore, it cannot be expected to maintain the hardness at high temperatures. On the contrary, when the copper and/or magnesium are added together with the chromium, the hardness which is raised during the rolling by the effect of the addition of the copper and/or magnesium is not so much lowered by the annealing, which is brought about by the addition of the chromium. This hardness can be maintained under high temperature conditions. Therefore, as compared with the prior art alloys, the bearing alloy of the present invention has a higher hardness at high temperatures, which results in an improvement in the fatigue strength. When the copper and magnesium are simultaneously added, it is desirable that the total quantity of them is not more than 3 wt.%, while the quantity of copper itself is not more than 2 wt.%.

Further, in the bearing alloy of the present invention, the property as a slidable metal containing tin can be further improved by adding more than zero to 9 wt.%, preferably 0.5 to 5.0 wt.% in total of one member or more of lead (Pb), bismuth (Bi) and indium (In). The effect of the addition of these lead, bismuth and indium is exhibited when they are added together with chromium. In the prior art, it has been considered that these elements are added to Al-Sn base alloys and the addition has been practiced in some cases. However, when only these elements are added to the Al-Sn base alloy, they form alloys so that the disadvantage that the melting point of tin becomes low cannot be avoided. Thus, the fusion and the migration of tin at low temperatures is liable to occur in the prior art Al-Sn base alloy, which causes the growth of tin particles into larger and coarse ones. When such alloy is employed as a bearing material, partial fusion and scraping are caused to occur under continuous heavy load running. On the contrary, the tin particles are made fine by the addition of chromium and such the texture is maintained at high temperatures in the bearing alloy of the present invention. Therefore, even when one or more of the above lead, bismuth and indium are added to the alloy, the lubricating property of tin can be improved without causing the above troubles in the prior art. Further, the bearing alloy of the invention can be used for the bearing of which a high fatigue strength is required. In addition, it becomes possible to improve the conformability of the bearing material. As described above, the addition quantity of one or more of the lead, bismuth and indium having the above effects is in the range of more than zero to 9 wt.% in total. Further, it is desirable that the total addition quantity of lead, bismuth, indium and tin is not more than 35 wt.%. The one or more of lead, bismuth and indium can be added together with the above-mentioned copper and/or magnesium, in which the lowering of the high temperature hardness can be reduced. At the same time, the lubricating property of tin can be improved.

The above-described Al-Sn base bearing alloy is mainly used as the sliding bearings of automobile internal combustion engines or the like, in which the bearing alloy is generally applied to backing steel sheets by pressure welding and, in order to increase the adhesive strength, the annealing is done after the pressure welding. However, in the prior art Al-Sn base alloys, the lowering of the hardness, the fusion of tin particles and so forth are caused to occur because the migration of aluminum grain boundaries and tin particles in the alloy texture is brought about which causes the coarsening of the tin particles. While in the present invention, the migration of aluminum grain boundaries and the growth of aluminum crystal particles are effectively avoided by the precipitated substance of Al-Cr inter-metallic compound which is generated in the pressure welding and annealing steps. Therefore, the bearing alloy of the present invention is free from the above ill influences of annealing and, as a result, the adhesion strength between the Al-Sn base alloy and backing steel sheets can be made high by raising the temperature of annealing. Since the above fact can be applied to the case in which the bearing alloy of the present invention is placed under the circumstances which correspond to the temperature of annealing, it is quite meaningful that the fatigue strength can be improved by the prevention of softening. Furthermore, the improvement in the wear resistance is also observed. Especially, the bearing alloy is quite effective when it is used for the shafts made of spherical graphite cast iron.

With taking all the properties into consideration such as the adaptability to casting and rolling, the adhesiveness to the backing steel sheet, the workability, the antiseizing property, the wear resistance and the sliding characteristic, the most preferable composition of the bearing alloy of the present invention is 7.5-25 wt.% of Sn; 0.1-0.7 wt.% of Cr; 1.0-6.0 wt.% of the specified additive group; 0.1-2.0 wt.% of Cu and/or Mg; 0.5-5.0 wt.% of Pb, Bi and/or In; and the remainder of Al. When the above elements of Pb, Bi and/or In are not added, the quantity of Sn may be increased to 10-30 wt.%. Further, the addition of Cu and/or Mg can be omitted.

In the following, the present invention will be described further in detail by several examples.

The following Table A and Table B show the compositions of the alloys (specimens) of the present invention 1a-27a and 1b-13b, and comparative alloys (specimens) 28a-34a and 14b-17b. The table is divided into A and B and the numbers of specimens are accompanied with subscripts of a and b. This depends upon the fact that, as described above, 0.1 wt.% to 1.0 wt.% of chromium is an indispensable component for the alloy of the present invention. However, the chromium is included also in the group of specified additives. Accordingly, when chromium is used as one of the group of specified additives, the total quantity of chromium becomes more than 1.0 wt.% in most cases. Thus, the cases in which the specified additives besides chromium are used, are shown in Table A with using the subscript a and when the chromium is selected as the member of the specified additives, the specimens are shown in Table B with the subscript b. This shall be applied to the accompanying graphs showing the test results and the symbols A and B attached to figure numbers correspond to the above-mentioned A and B of the tables.

In the preparation of the alloys 1a to 27a and 1b to 13b, an aluminum material was melted in a gas furnace and, in accordance with the formulae of Table A, Al-Cr, Al-Cu, Al-Mg, Al-Si, Al-Mn, Al-Sb, Al-Ti, Al-Fe and Al-Zr base alloys were dissolved into the molten aluminum, respectively. After that, Sn and Pb, Bi and In were added and degassing was performed. Then, metal mold casting was performed, which was followed by repeated rolling and annealing (350° C.) to obtain specimens. The high temperature hardnesses of the specimens were then measured. In the next step, these specimens were subjected to rolling and after that, the alloy specimens were fixed to backing steel sheets by pressure welding to obtain bimetallic specimens. These were then subjected to annealing and worked into plain bearings and the fatigue resistance under dynamic loads of them were tested. In like manner as the above, alloys 28a to 34a and 14b to 17b for comparative tests, were also prepared and they were subjected to the same tests.

TABLE A

| Alloy Example Numbers | Al | Sn | Cr | Cu | Mg | Pb | Bi | In | Si | Mn | Sb | Ti | Ni | Fe | Zr |
|---|---|---|---|---|---|---|---|---|---|---|---|---|---|---|---|
| 1a | Re | 4 | 0.1 | 10 | | | | | | 40 | | | | | |
| 2a | Re | 4 | 0.3 | | | 30 | | | | 1.0 | | | | 3.0 | |
| 3a | Re | 7.5 | 0.1 | 0.2 | | 0.5 | | | | 1.0 | | | | | |
| 4a | Re | 10 | 0.3 | | | | | | 3.0 | | | | | | |
| 5a | Re | 10 | 0.5 | 0.5 | | 1.5 | | | | 1.0 | | | | | |
| 6a | Re | 10 | 0.8 | 1.0 | | | | | | | | 6.0 | | | |
| 7a | Re | 10 | 0.1 | | | | | | 1.0 | | | | | | |
| 8a | Re | 10 | 0.1 | 0.2 | | | | | 1.0 | | | | | | |
| 9a | Re | 15 | 0.5 | | | | 2.0 | | | | | 3.0 | | | |
| 10a | Re | 15 | 0.5 | 1.0 | | 2.0 | | | 3.0 | | | | | | |
| 11a | Re | 15 | 0.4 | 7.0 | | 3.0 | | | 3.0 | | | | | | |
| 12a | Re | 15 | 0.4 | 0.5 | | 2.0 | | | 3.0 | | 0.05 | | | | |
| 13a | Re | 15 | 0.4 | 0.5 | | 2.0 | | | 0.5 | | 0.5 | | | | |
| 14a | Re | 17 | 0.5 | 1.0 | | 2.0 | 0.5 | | | | | | | | 3.0 |
| 15a | Re | 17 | 0.5 | 1.0 | | 3.0 | | | 2.5 | | 2.0 | | | | |
| 16a | Re | 17 | 0.8 | | 1.0 | 3.0 | | | | 4.0 | | | | | |
| 17a | Re | 20 | 0.5 | 1.0 | | 3.0 | | | 3.0 | | | | | | |
| 18a | Re | 20 | 0.5 | 1.0 | | | | | | | 1.5 | | | | |
| 19a | Re | 20 | 0.4 | | | | | | 3.0 | | | | | | |
| 20a | Re | 20 | 0.4 | 1.0 | | | | | 3.0 | | | | | | |
| 21a | Re | 25 | 0.5 | 1.0 | | 1.0 | | | | | | | | 3.0 | |
| 22a | Re | 25 | 1.0 | | | 5.0 | | 2.0 | 4.0 | | | | | | |
| 23a | Re | 25 | 0.7 | 2.0 | | 5.0 | | | 6.0 | | | | | | |
| 24a | Re | 30 | 0.5 | 1.5 | 0.5 | | | | | 2.0 | | | | | |
| 25a | Re | 30 | 0.7 | | | | | | 6.0 | | | | | | |
| 26a | Re | 30 | 0.7 | 2.0 | | | | | 6.0 | | | | | | |
| 27a | Re | 35 | 0.5 | 1.0 | | 7.0 | | | 4.0 | | | | | | |
| 28a | Re | 15 | 0.5 | 1.0 | | 2.0 | | | | | | | | | |
| 29a | Re | 25 | 1.0 | 1.0 | | | | | | | | | | | |
| 30a | Re | 4 | | 1.0 | | | | | 4.0 | | | | | | |
| 31a | Re | 6 | | 1.0 | | | | | 1.5 | | | | 0.5 | | |
| 32a | Re | 17 | | 1.0 | | | | 3.0 | 2.5 | | 2.0 | | | | |
| 33a | Re | 20 | | 1.0 | | | | | | | | | | | |
| 34a | Re | 20 | | 1.0 | | | | | 3.0 | 3.0 | | | | | |

Note:
Re = remainder

TABLE B

| Alloy Example Numbers | Al | Sn | Cr | Cu | Mg | Pb | Bi | In | Si | Ni |
|---|---|---|---|---|---|---|---|---|---|---|
| 1b | Re | 10 | 1.2 | | | | | | | |
| 2b | Re | 17 | 3.0 | | | | | | | |
| 3b | Re | 35 | 1.5 | | | | | | | |
| 4b | Re | 17 | 6.5 | | | | | | | |
| 5b | Re | 17 | 3.0 | 0.7 | | | | | | |
| 6b | Re | 20 | 5.0 | 2.5 | | | | | | |
| 7b | Re | 17 | 2.0 | 0.3 | 0.3 | | | | | |

TABLE B-continued

| Alloy Example Numbers | Constituent Elements (wt. %) | | | | | | | | |
|---|---|---|---|---|---|---|---|---|---|
| | Al | Sn | Cr | Cu | Mg | Pb | Bi | In | Si | Ni |
| 8b | Re | 17 | 3.0 | | 2.0 | | | | | |
| 9b | Re | 17 | 3.0 | 0.5 | | 3.0 | | | | |
| 10b | Re | 17 | 3.0 | 0.7 | | 7.0 | | | | |
| 11b | Re | 17 | 2.0 | 0.7 | | 2.0 | 1.0 | | | |
| 12b | Re | 17 | 3.0 | 0.7 | | 2.0 | 1.0 | 0.5 | | |
| 13b | Re | 4 | 2.0 | 0.5 | | 1.0 | | | | |
| 14b | Re | 20 | | 0.7 | | | | | | |
| 15b | Re | 20 | | 1.0 | | | | | 3.0 | |
| 16b | Re | 20 | | 0.5 | | 3.0 | | | 3.0 | |
| 17b | Re | 6 | | 1.0 | | | | | 1.5 | 0.5 |

Figure 1B:
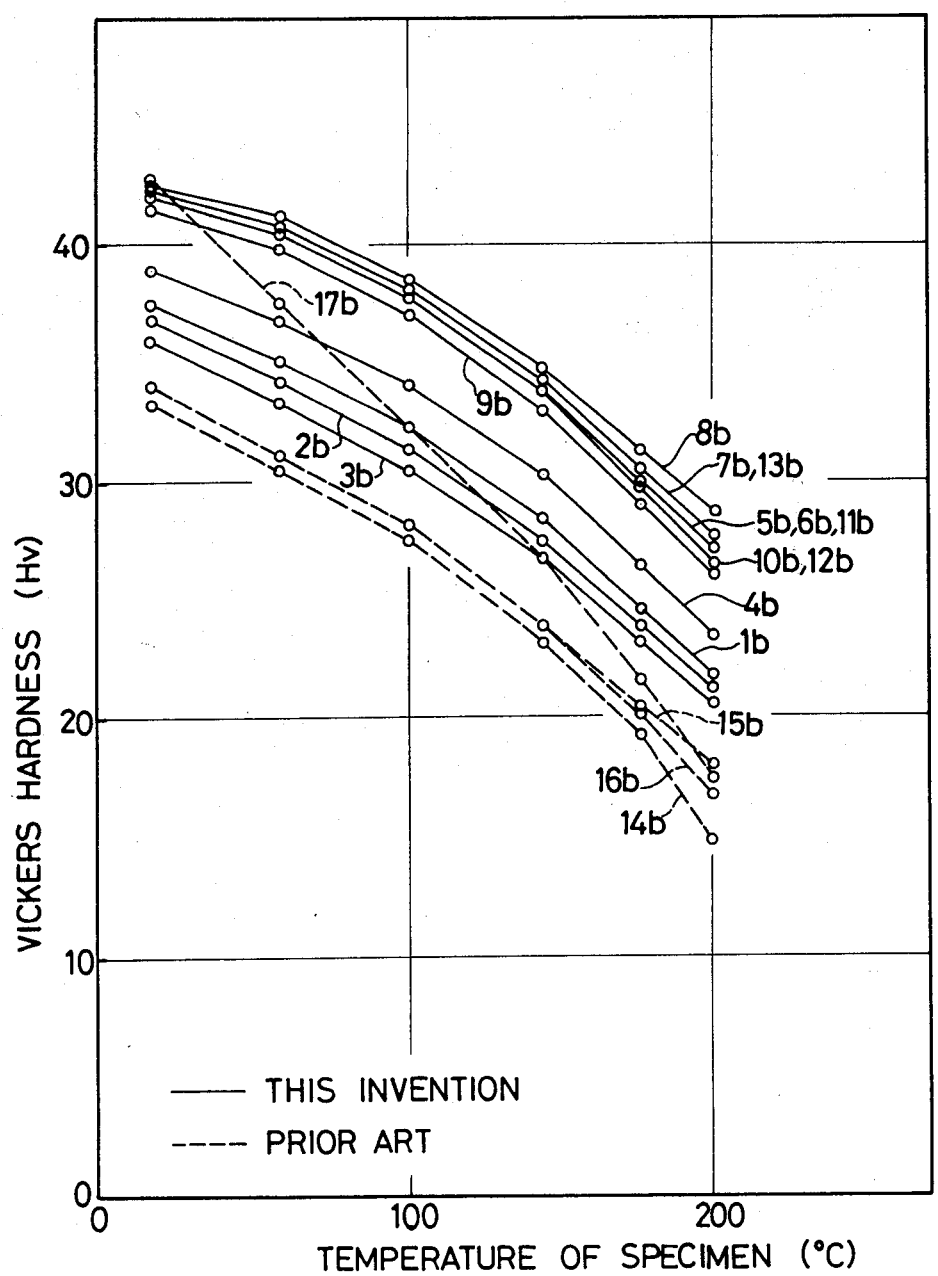

FIGS. 1A and 1B shows the Vickers hardnesses of the foregoing alloys at elevated temperatures. As will be understood from these graphs, the alloys 1a–27a and 1b–13b of the present invention are generally higher than the comparative alloys 28a–34a and 14b–17b in the Vickers hardness in the high temperature range. In the cases of the comparative alloys 30a and 17b, they are high in hardness in the low temperature range, however, the hardnesses of them rapidly decrease with the rise of temperature. On the contrary, in the alloys 1a–27a and 1b–13b of the present invention, the degree of the lowering in hardness with the rise of temperature is gentle. Accordingly, the change of conditions of bearing with the change of temperature can be made little. Further, the hardness of alloys containing Cu and/or Mg is considerably higher than that of others all over the temperature range. In addition, the lowering of hardness of them with the rise of temperature is small as compared with the alloys 30a and 17b and, especially, the hardness of the alloys containing Cu and/or Mg is maintained high at the temperature of 200° C. This fact apparently depends upon the addition of Cu and/or Mg. Furthermore, in view of the texture of alloys, the coarsening of tin particles is not observed through the annealing after the bonding with backing steel in the alloys 1a–27a and 1b–13b of the present invention.

Figure 2B:
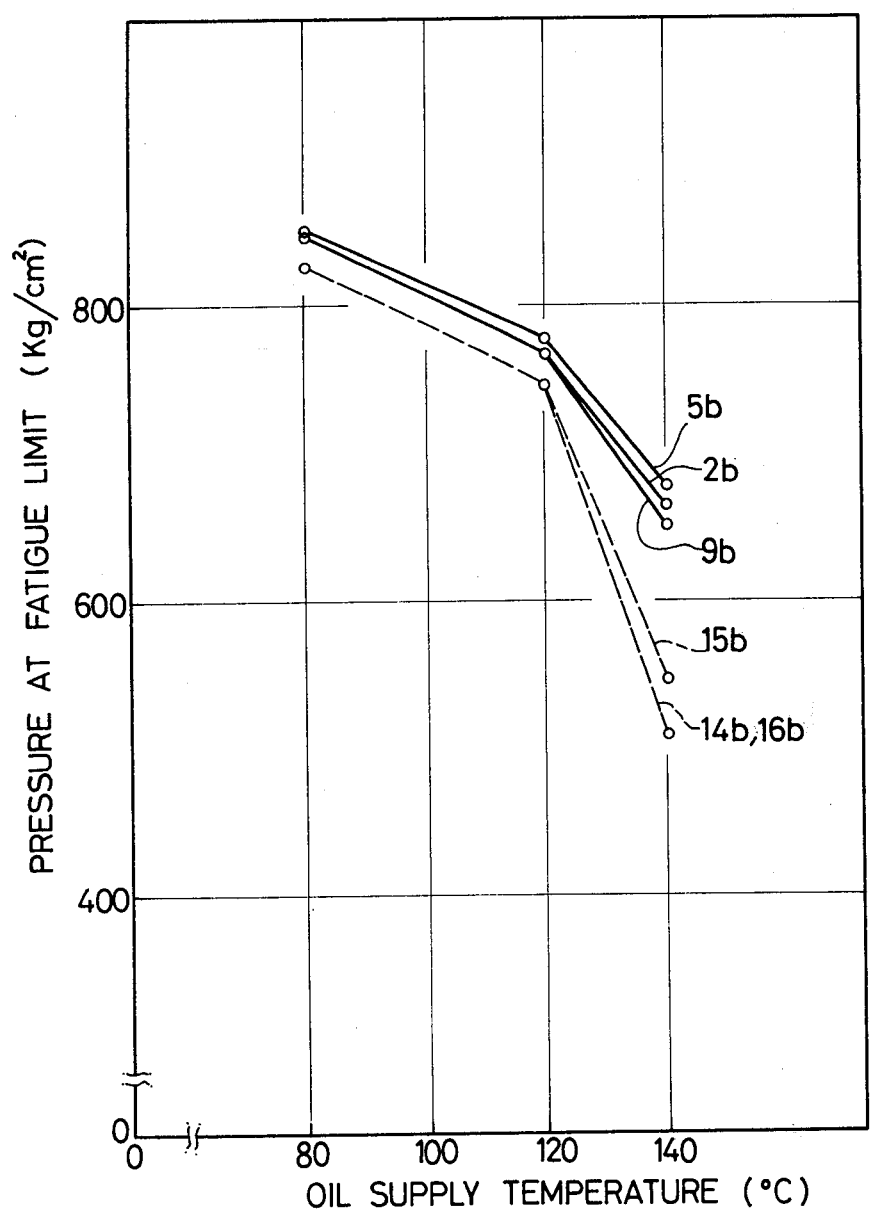

FIGS. 2A and 2B show the results of bearing fatigue tests under dynamic loads in connection with the typical alloys 4a, 10a and 17a of the present invention and the comparative alloys 33a and 34a, and the alloys 5b, 2b and 9b of the present invention and the comparative alloys 14b, 15b and 16b. In these tests, the pressures at fatigue limits at different temperatures were measured under forced lubrication with lubricant oil of a constant temperature and by using a quenched shaft material of AISI 1055 of the shaft revolution of 3000 rpm and with $10^7$ times repetition of stressing, which is generally employed for measuring the fatigue condition of steel material. As will be understood from these graphs, the pressures at fatigue limits of the alloys 33a, 34a and 14b, 15b, 16b become low at high temperatures, however, the degrees of lowering in these values of the alloys 4a, 10a, 17a and 5b, 2b and 9b of the present invention are smaller than those of the above comparative alloys. Even though the difference in the pressure at fatigue limit between the alloy of the present invention and the comparative alloy is not so large in lower temperatures, it is apparent that the alloy of the present invention exceeds the prior art comparative alloy in such the value under high temperature conditions. Further, the test results that are shown in FIGS. 2A and 2B relate to some of the alloys of the present invention and the comparative alloys. However, it has been understood that similar results are obtained in connection with other alloys.

Figure 3:
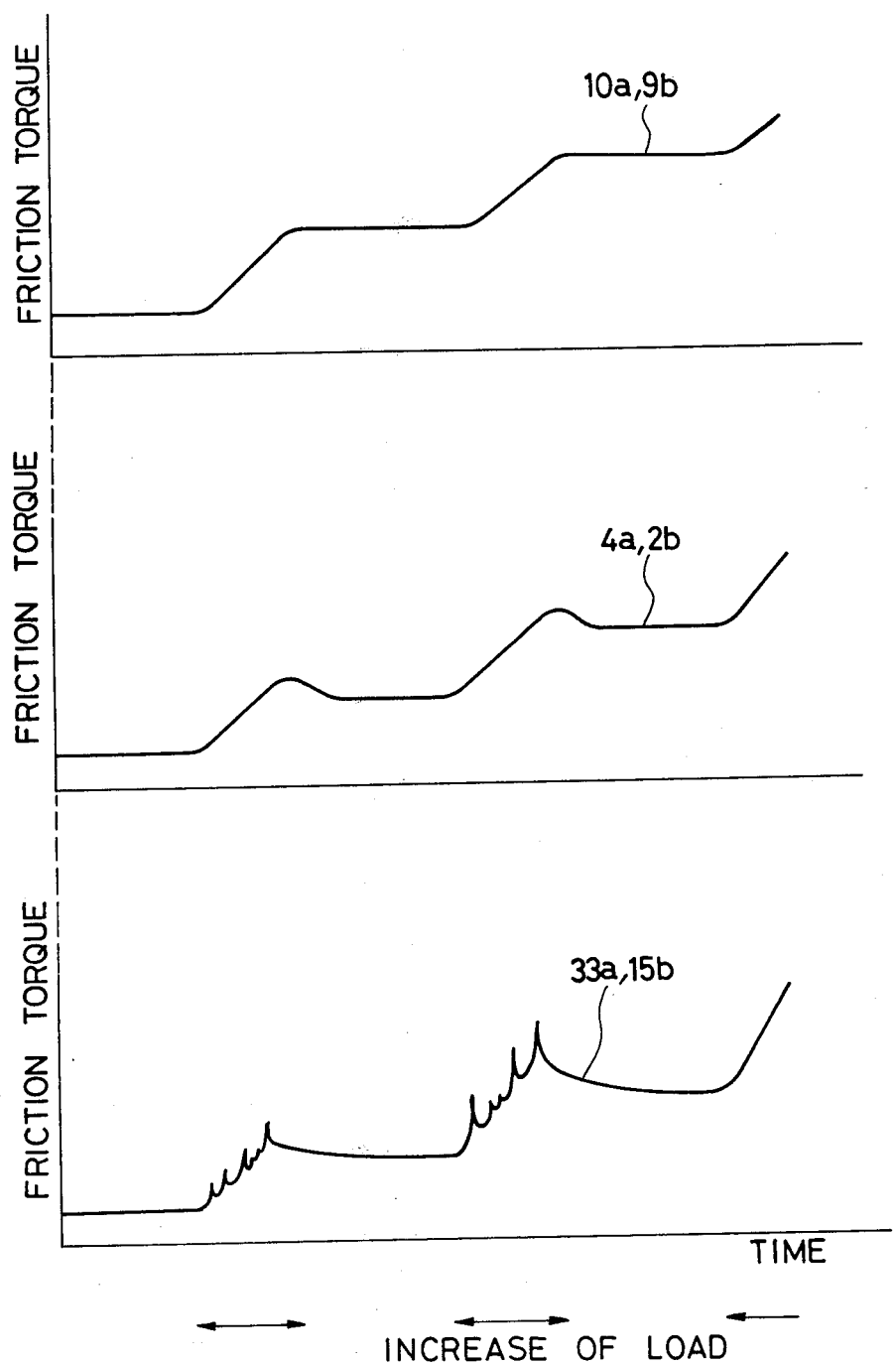
FIG. 3 illustrates graphic patterns showing the changes in friction torques with the increases of loads in connection with the same.

Shown in FIG. 3 are the changes in friction torques with the increase in load in connection with the alloys 10a, 4a, 9b and 2b, and the comparative alloys 33a and 15b. In these tests, AISI 1055 quenched shaft materials were used at the revolution speed of 1000 rpm with the forced lubrication of a constant oil temperature (140° C.), and the change of friction torque with the increase of load was measured with using an oscillograph. According to the graphs of FIG. 3, peaks of friction torques are caused to occur with the increase of load to the prior art alloys 33a and 15b and the values are largely fluctuated. In the case of the alloys 4a and 2b, the friction torque increases gradually without the formation of any peak and the dome-shaped changes in friction torque are observed at the ceasing of the increase of load. While in the case of the alloys 10a and 9b of the present invention, the friction torque is gradually increased with the increase of the load and any undesirable change in the friction torque is not observed. Therefore, it will be understood that the alloys of the present invention, especially those of 10a and 9b containing lead, are excellent in conformability and are free from the seizure. In other words, the fluctuating peak waves in the prior art alloys 33a and 15b means that the oil film on the sliding surface is partially broken which causes solid contact and when such the contact is repeated, the whole breakage (seizure) is brought about. The alloys 10a and 9b of the present invention which are free from such the wave forms, are advantageous in view of the conformability and antiseizing property.

Figure 4:
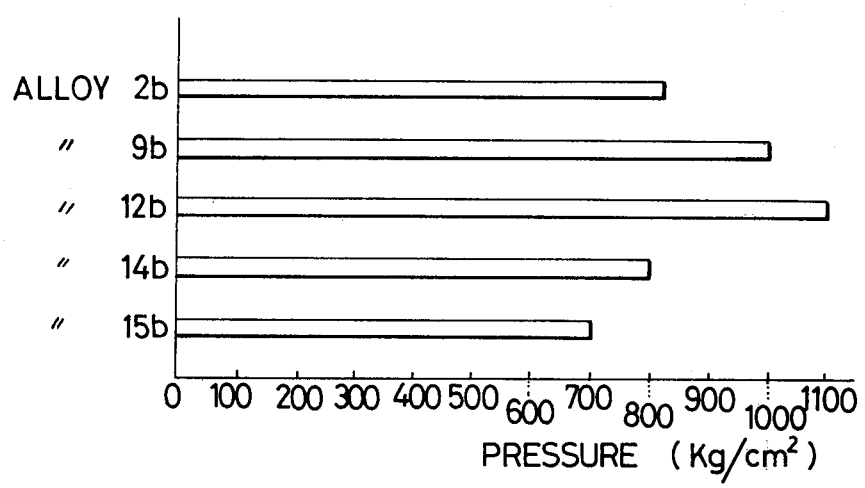
FIG. 4 is a graph showing the seizing pressures to steel shafts.

In FIG. 4, the test results of seizing loads are shown in connection with the alloys 2b, 9b and 12b of the present invention and the comparative alloys 14b and 15b. The tests were carried out under the same conditions of the preceding tests. From these results, it will be understood that the antiseizing property of the alloys of the present invention is quite good. It is considered that this fact depends upon the addition of the additives of Pb, Bi and In for improving the conformability.

Figure 5B:
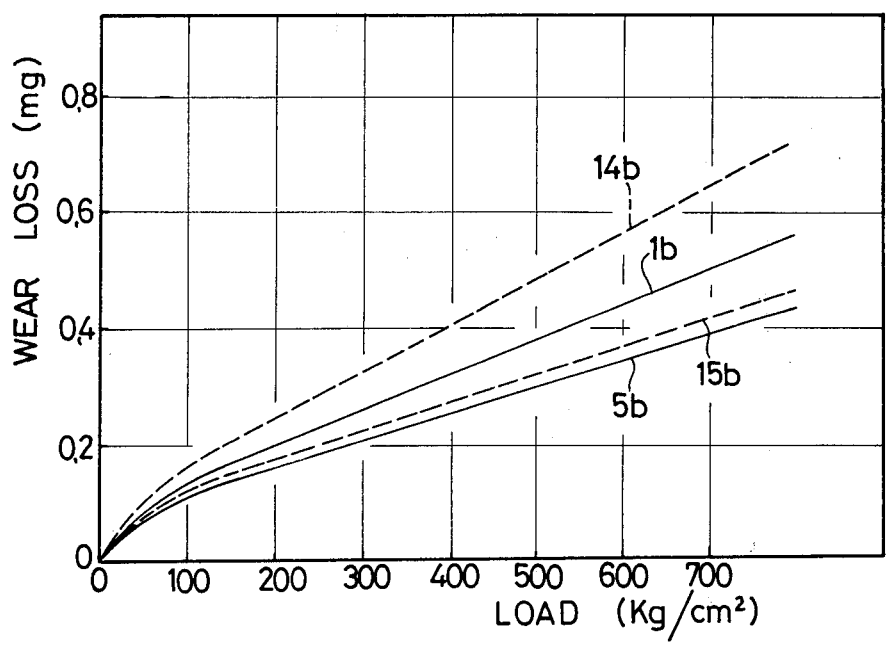

Shown in FIGS. 5A and 5B are the results of friction tests, in which the alloys 4a, 10a and 17a of the present invention and the comparative alloys 28a, 29a and 33a, and the alloys 1b and 5b of the present invention and the comparative alloys 14b and 15b are compared, respectively. In these tests, AISI 1055 quenched shaft material was used at the revolution speed of 1000 rpm under forced lubrication at a constant oil temperature (120° C.). The coarseness of the shaft surface was 1 μm and the wear losses were measured with increasing the loads. From these graphs, it will be understood that the wear losses of the alloys 4a, 10a and 17a of the present invention are quite little as compared with those of the comparative alloys 28a, 29a and 33a. This fact depends upon the addition of the specified additives such as Si and Mn. In the B series, the prior art alloy 15b has about the same wear resistance as those of the alloys 1b and 5b of the present invention. This is due to the addition of Si to the alloy 15b. When the addition quantity of the additives of Si and/or Mn becomes large, the wear resistance generally becomes high.

Figure 6B:
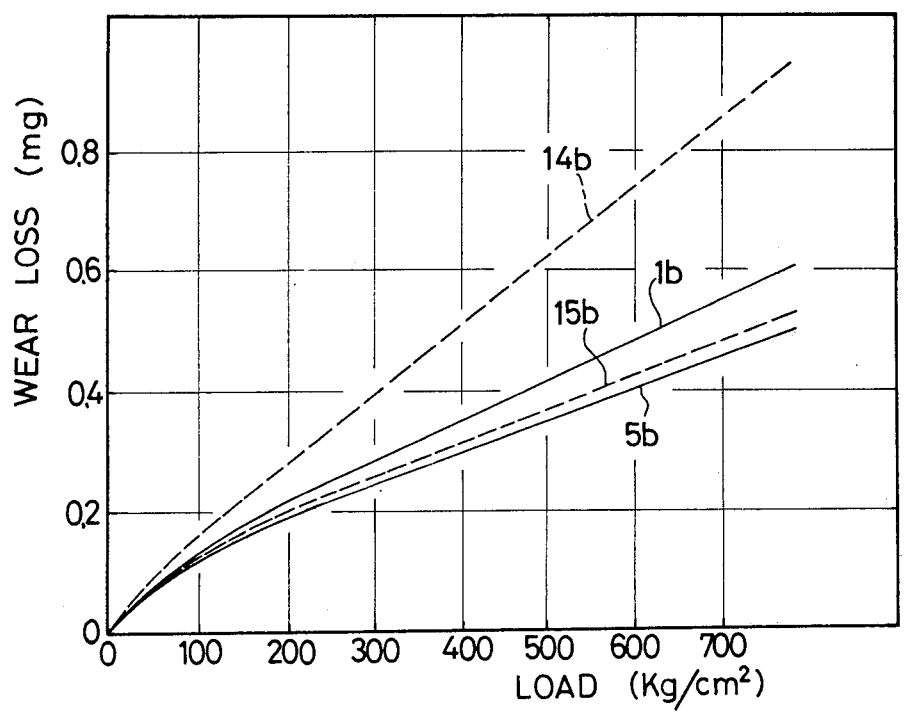

In FIGS. 6A and 6B, the results of other friction tests are shown, in which the alloys are the same as those of FIGS. 5A and 5B and the shafts made of spheroidal (nodular) graphite cast iron were used under similar test conditions. As compared with the cases of FIGS. 5A and 5B, the differences in abrasion losses between the alloys 4a, 10a and 17a and the comparative alloys 28a, 29a and 33a are large. This fact is applied to the case of the alloys 1b, 5b and the alloys 14b. As described above, the effect in the improvement of wear resistance by the addition of the specified additives such as Si, Cr, Mn, Sb, Ti, Ni, Zr and Fe becomes distinct when the shaft of spheroidal graphite cast iron is used as compared with the case of the steel shaft.

Shown in FIGS. 7A and 7B are the results of seizing tests with regard to the alloys 4a, 10a, 17a, 28a, 29a, 33a and 1b, 2b, 9b, 14b, 15b and 16b. These tests were performed with using the shafts of spheroidal graphite cast iron of 1000 rpm under forced lubrication at a constant oil temperature (140° C.), and the static loads to cause the seizure were measured. The seizing surface pressures of the alloys containing the specified additives (4a, 10a, 17a, 1b, 2b, 9b, 15b and 16b) are high. Among all, the alloys (10a, 17a, 9b and 16b) containing further Pb have excellent antiseizing property.

Figure 8:
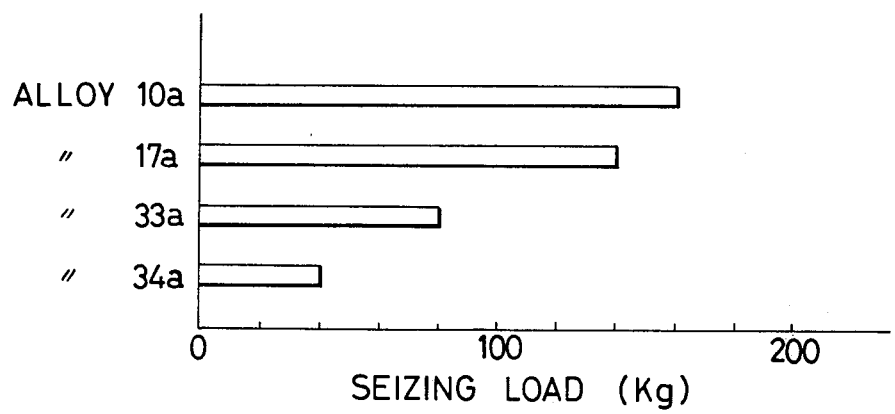
FIG. 8 is a graph showing the seizing surface pressures of alloys which are in contact with the shafts made of nodular graphite cast iron under different experiment conditions.

In FIG. 8, the results of seizing load tests are shown, which tests were carried out by using a plain seizing tester. In the tests, a 18 mm$\phi$ test piece (surface coarseness: 0.9–1.1 $\mu$m) was pressed to rotary disk at a sliding velocity of 13 m/sec, which disk was made of nodular graphite cast iron (surface coarseness: 0.4–0.5 $\mu$m, maximum depth of the pit of graphite particle: 20 $\mu$m) and the load when seizure is caused to occur was measured. The pressing load was increased 20 Kg/cm$^2$ at every 20 minutes. As the lubricant, SAE No. 30 oil and diesel gas fuel (light oil) in the ratio of 2:1 were mixed together and 0.2 cc/min of the mixture was supplied to the sliding portion. Like the results of FIGS. 7A and 7B, the antiseizing properties of the alloys 10a and 17a of the present invention are apparently good.

By the way, it should be noted that in the composition of the alloy of the present invention, the aluminum (Al) may of course contain a trace quantity of impurities which cannot be eliminated by the ordinary refining technique.

Although the present invention has been described in connection with preferred examples thereof, many variations and modifications will now become apparent to those skilled in the art. It is preferred, therefore, that the present invention be limited not by the specific disclosure herein but only by the appended claims.

What is claimed is:

1. An Al-Sn base, bearing alloy, consisting essentially of: from 3.5 to 35 wt.% of Sn; from 0.1 to 1.0 wt.% of Cr; from 1 to 10 wt.%, in total, of one or more additive elements selected from the group consisting of Si, Mn, Sb, Ti, Ni and Fe; and the balance is Al.

2. The Al-Sn base, bearing alloy as claimed in claim 1, containing at least 7.5 wt.% of Sn.

3. The Al-Sn base, bearing alloy as claimed in claim 1, which contains from 1 to 10 wt.% of Si.

4. The Al-Sn base, bearing alloy as claimed in claim 1, which contains from 10 to 30 wt.% of Sn; from 0.1 to 0.7 wt.% of Cr; and from 1.0 to 6.0 wt.% of said additive elements.

5. A bearing material which is made by applying said bearing alloy as claimed in claim 1 to a backing steel sheet by pressure welding.

6. A bearing alloy as claimed in claim 1, wherein said bearing alloy is in contact with a shaft material which is made of spheroidal graphite cast iron.

7. An Al-Sn base, bearing alloy, consisting essentially of: from 3.5 to 35 wt.% of Sn; from 0.1 to 1.0 wt.% of Cr; from 1 to 10 wt.%, in total, of one or more additive elements selected from the group consisting of Si, Mn, Sb, Ti, Ni and Fe; up to 3 wt.%, in total, of Cu, Mg or Cu plus Mg; and the remainder is Al.

8. The Al-Sn base, bearing alloy as claimed in claim 7, containing at least 7.5 wt.% of Sn.

9. The bearing alloy as claimed in claim 7, which contains from 0.1 to 2.0 wt.% of Cu, Mg or Cu plus Mg.

10. The bearing alloy as claimed in claim 7 or 9, which contains from 1 to 10 wt.% of Si.

11. The bearing alloy as claimed in claim 7, which contains from 10 to 30 wt.% of Sn; from 0.1 to 0.7 wt.% of Cr; from 1.0 to 6.0 wt.% of said additive elements; and from 0.1 to 2.0 wt.% of Cu, Mg or Cu plus Mg.

12. A bearing material which is made by applying said bearing alloy as claimed in claim 7 to a backing steel sheet by pressure welding.

13. The bearing alloy as claimed in claim 7, wherein said bearing alloy is in contact with a shaft material which is made of spheroidal graphite cast iron.

14. An Al-Sn base, bearing alloy, consisting essentially of: from 3.5 to 35 wt.% of Sn; from 0.1 to 1.0 wt.% of Cr; from 1 to 10 wt.%, in total, of one or more additive elements selected from the group consisting of Si, Mn, Sb, Ti, Ni and Fe; up to 9 wt.%, in total, of one or more members selected from the group consisting of Pb, Bi and In; and the remainder is Al.

15. The Al-Sn base, bearing alloy as claimed in claim 14, containing at least 7.5 wt.% of Sn.

16. The bearing alloy as claimed in claim 14, wherein said alloy further contains up to 3 wt.% of Cu, Mg or Cu plus Mg.

17. The bearing alloy as claimed in claim 14 or 16, which contains from 1 to 10 wt.% of Si.

18. The bearing alloy as claimed in claim 14, which contains from 7.5 to 25 wt.% of Sn; from 0.1 to 0.7 wt.% of Cr; from 1.0 to 6.0 wt.% of said additive elements; from 0.1 to 2.0 wt.% of Cu, Mg or Cu plus Mg; and from 0.5 to 5.0 wt.% of one or more members selected from the group consisting of Pb, Bi and In.

19. A bearing material which is made by applying said bearing alloy as claimed in claim 14 to a backing steel sheet by pressure welding.

20. The bearing alloy as claimed in claim 14, wherein said bearing alloy is in contact with a shaft material which is made of spheroidal graphite cast iron.

* * * * *

REEXAMINATION CERTIFICATE (1556th)
United States Patent [19]
ara et al.

[11] B1 4,278,740
[45] Certificate Issued  Sep. 17, 1991

[ ] ALUMINUM-TIN BASE BEARING ALLOY AND COMPOSITE

[ ] Inventors: Tamotsu Nara, Toyota; Soji Kamiya, Nishio, both of Japan

[ ] Assignee: Taiho Kogyo Co., Ltd., Toyota, Japan

Reexamination Request:
No. 90/002,257, Jan. 23, 1991

Reexamination Certificate for:
Patent No.: 4,278,740
Issued: Jul. 14, 1981
Appl. No.: 47,336
Filed: Jun. 11, 1979

[ ] Foreign Application Priority Data

Jul. 11, 1978 [JP] Japan .................. 53/84232
Jul. 11, 1978 [JP] Japan .................. 53/84233

[ ] Int. Cl.$^5$ .............................. B32B 15/04
[ ] U.S. Cl. ..................... 428/653; 420/530; 420/542; 420/550; 420/554
[ ] Field of Search ............ 428/653; 420/530, 542, 420/550, 554

[ ] References Cited

U.S. PATENT DOCUMENTS 4,153,756  5/1979  Iwahana ..................... 428/653

FOREIGN PATENT DOCUMENTS

| | | |
|---|---|---|
| 618343 | 8/1978 | U.S.S.R. . |
| 569337 | 5/1945 | United Kingdom . |
| 597113 | 1/1948 | United Kingdom . |
| 611212 | 10/1948 | United Kingdom . |
| 616776 | 1/1949 | United Kingdom . |
| 623486 | 5/1949 | United Kingdom . |
| 723562 | 2/1955 | United Kingdom . |
| 1073428 | 6/1967 | United Kingdom . |
| 1133426 | 11/1968 | United Kingdom . |
| 1303923 | 1/1973 | United Kingdom . |
| 1433890 | 4/1976 | United Kingdom . |
| 1445525 | 8/1976 | United Kingdom . |

Primary Examiner—Richard O. Dean

[57] ABSTRACT

An aluminum-tin (Al-Sn) base bearing alloy and a bearing material which is made by applying the Al-Sn base bearing alloy to a backing steel sheet by pressure welding. The Al-Sn base bearing alloy of the invention is characterized in that the coarsening of tin particles and the lowering of the hardness under high temperature conditions are quite small so that the wear resistance as well as the fatigue strength of the alloy are quite excellent. The Al-Sn base bearing alloy comprises 3.5-35 wt. % of Sn; 0.1-1.0 wt. % of Cr; 1-10 wt. % in total of one or more members selected from the group of specified additives consisting of Si, Cr, Mn, Sb, Ti, Zr, Ni and Fe; and the remainder of aluminum. The Al-Sn base bearing alloy of the invention can further contain 3 wt. % or less in total of Cu and/or Mg and 9 wt. % or less in total of one or more members of Pb, Bi and In, thereby improving the bearing characteristics. The wear resistance of this bearing alloy can be expected even when the shaft to be supported is hard and the shaft surface is coarse. Accordingly, a marked effect can be obtained when the bearing alloy is used for the bearing devices of internal combustion engines in which spheroidal (nodular) graphite cast iron is generally used for crank shafts.

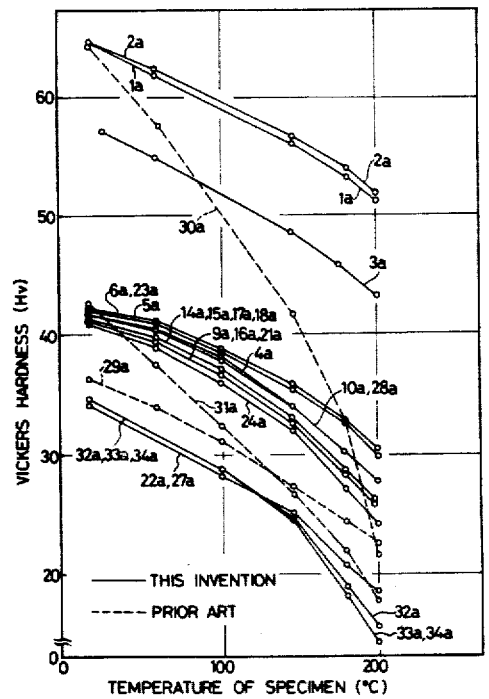

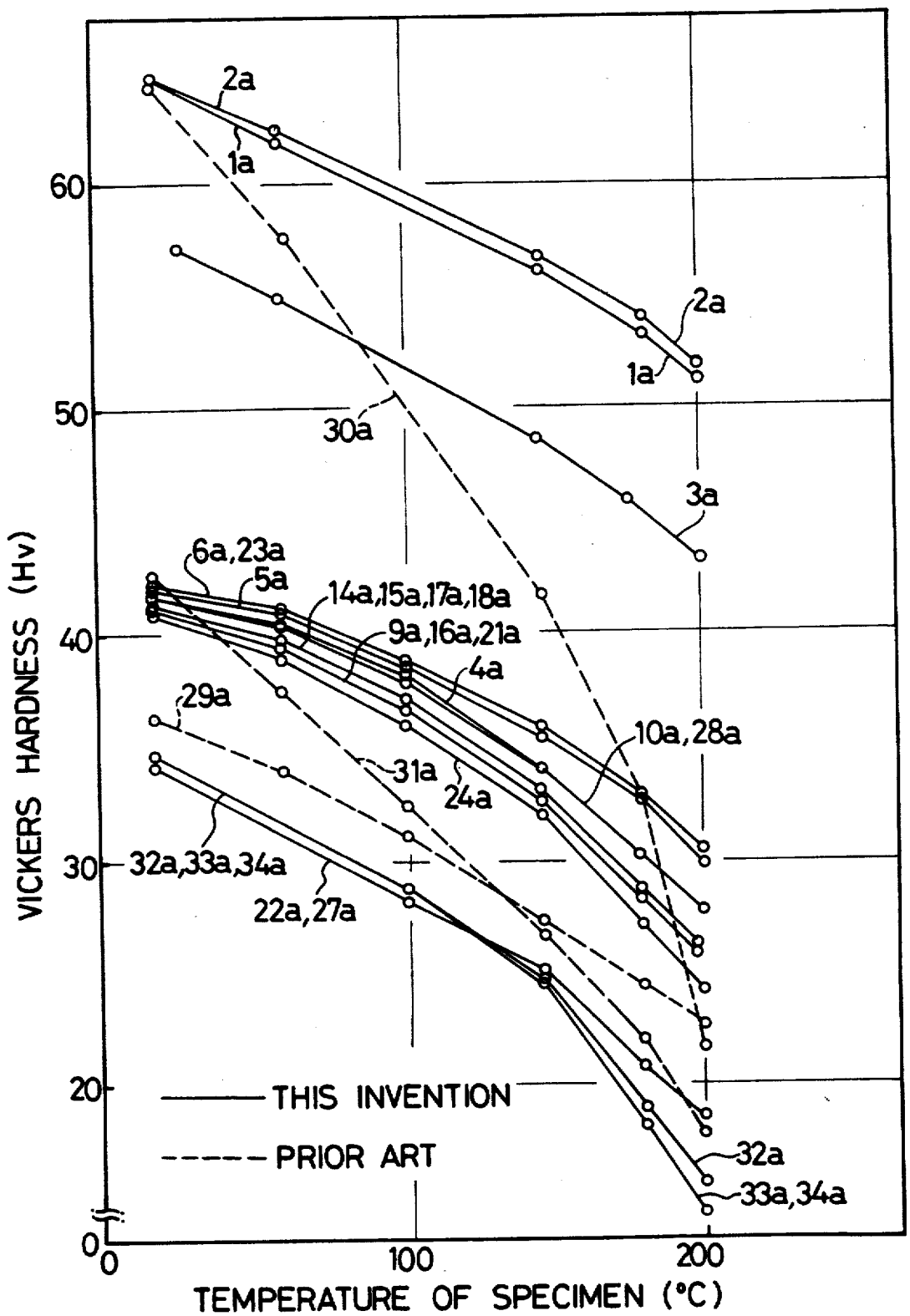

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *